R. S. SMITH.
METAL WHEEL.
APPLICATION FILED OCT. 9, 1916.

1,347,183. Patented July 20, 1920.

WITNESSES

INVENTOR
Reuben Stanley Smith
BY Erwin & Wheeler
ATTORNEYS

UNITED STATES PATENT OFFICE.

REUBEN STANLEY SMITH, OF MILWAUKEE, WISCONSIN.

METAL WHEEL.

1,347,183.  Specification of Letters Patent.  Patented July 20, 1920.

Application filed October 9, 1916. Serial No. 124,498.

*To all whom it may concern:*

Be it known that I, REUBEN STANLEY SMITH, citizen of the United States, residing at Milwaukee, county of Milwaukee, and State of Wisconsin, have invented new and useful Improvements in Metal Wheels, of which the following is a specification.

My invention relates to improvements in metal wheels with especial reference to vehicle wheels. The objects of my invention are to provide a form of construction in which the spokes and rim may be pressed from sheet metal, contoured to secure a degree of resiliency sufficient to relieve the material from excessive shock strains, and provide requisite strength and durability. Another object is to provide spokes which are adapted to directly receive a demountable rim, my improved rim and spokes being so formed that each spoke provides a seating for an inturned rim flange or set of flanges, and also provides a supporting shoulder against the side of which the rim flanges may be securely clamped, thus enabling me to dispense with fixed rims and wedges for rigidly binding the demountable rims in position, and avoiding the annoyances incident to the removal of demountable rims from the fixed rims, and the replacement thereof.

A further object is to provide an improved rim, formed in sections which are annularly separable, each section being provided with an inwardly projecting annular flange on its inner margin, which flanges are adapted for abutting contact with each other, with their inner margins formed to rest upon the spoke seatings. These flanges are clamped against the spoke shoulders by fastening bolts, which also serve to secure them together, although my invention also contemplates auxiliary fastening means for the flanges, whereby the rim may be removed bodily from the spokes, and its sections subsequently separated by releasing the auxiliary fastenings.

A further object of my invention is to provide a form of hub which is peculiarly adapted at one end to receive the specially contoured sheet metal spoke web, said hub being contoured at its other end to receive a specially formed brace web, or a set of braces, adapted to reinforce the spoke on the inner side, the wheel being preferably inwardly dished.

More generally stated, my object is to provide a resilient, durable metal wheel of light weight in proportion to its strength, and having a demountable rim attached directly to the spokes in such a manner that it can be easily and quickly removed, and replaced, or another rim substituted,—said rim being formed in separable sections adapted to readily release the tire casing when removed from the spokes.

In the drawings—

Like parts are identified by the same reference characters throughout the several views.

Figure 1:
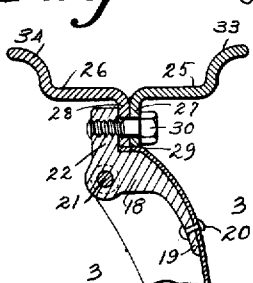
Figure 1 is a side view of a steel wheel embodying my invention.
Figure 2:
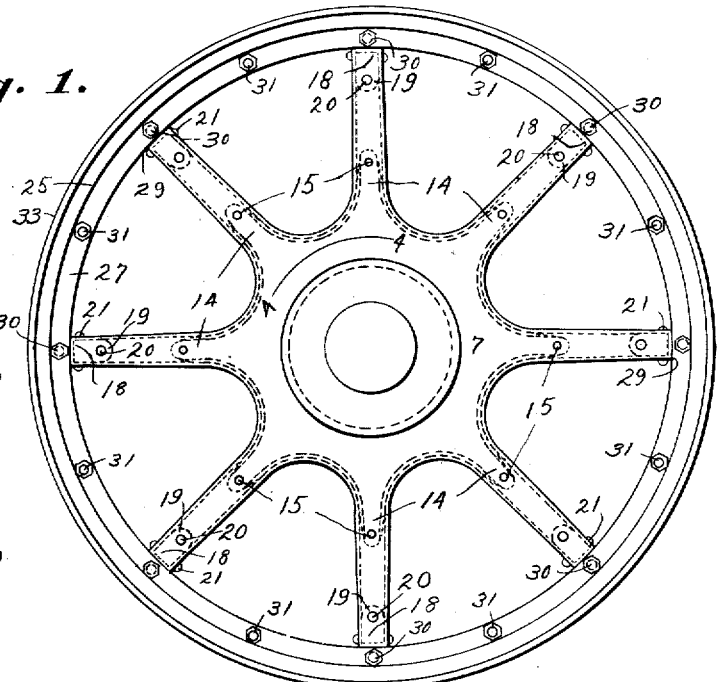
Fig. 2 is a sectional view drawn to a plane between the spokes and with the illustrated spoke partially broken away at its outer end in radial section to expose the head pieces.
Figure 3:
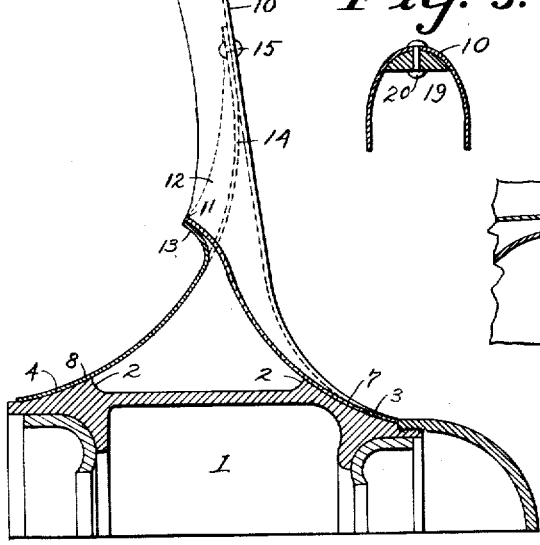
Fig. 3 is a cross-sectional view of one of the spokes.
Figure 4:
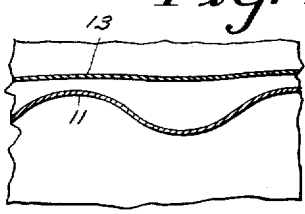
Fig. 4 is a fragmentary sectional view on line 4—4 of Fig. 1.

The hub barrel 1 is substantially cylindrical in form and is provided with radially projecting ribs 2 near its respective ends, and the outer faces of the end portions 3 and 4 beyond the ribs are concavely tapered to receive the footing webs 7 and 8 respectively. The web 7 provides common footing for the spokes 10, the latter comprising radially projecting integral arms which are partially folded longitudinally so that each spoke is substantially U-shaped in cross-section. The web 7 is pressed inwardly between the spokes to form valleys 11, continuous with the sides of the spokes at the inner ends of the latter, the bulging portions 12 of the web in line with each spoke being progressively bent inwardly at the sides, with increasing depth in the valleys as the outer margin of the web is approached, whereby the sides of the spokes, as well as the outer faces thereof, may be made integrally continuous with the web.

The spokes are preferably inclined toward the inner side of the wheel, said wheel being thus inwardly dished, and the web 8 is a bracing web. The marginal portions 13 of this web 8 are also pressed inwardly along curved lines between the spokes and lapped upon the inner faces of the valley portions 11 of web 7. Between these portions 13 of the bracing web 8, said web is provided with arms 14, which are formed from tapered extensions of the web, longitudinally folded to fit within the spokes 10, and each arm is preferably connected to the spoke within which it fits by a bolt or rivet 15, although any other means of connection may be employed. The folded sides of these arms diverge at their bases, with their margins continuous with the margins of the portions 13. The two webs, with their arms and spokes form close joints at least at all margins, with each other and with the hub, which may be secured and sealed by dip brazing the entire wheel, i. e., immersing it in a body of molten brazing spelter. The parts may also be secured by any suitable additional means such as welding or riveting, if desired.

The outer ends of the spokes are provided with head pieces 18, each contoured to fit within the end of the spoke and having an arm 19 projecting downwardly along the inner face of the outer wall of the spoke and preferably connected therewith by a rivet or bolt 20. Each head piece 18 is also connected with the side walls of the spoke by a rivet or bolt 21 beyond which the head is provided with a radially projecting arm 22, the front face of which is in a plane parallel with the central plane of the wheel or co-incident therewith. The front wall of the spoke laps over the outer face of the head piece and abuts against the shoulder formed by the arm 22, thereby forming a seating for the demountable rim which will now be described.

The rim is composed of two annular members 25 and 26 respectively. The meeting margins of these members are inturned to form strengthening and connecting flanges 27 and 28. When the rim is in position, the inner margins of these flanges abut the faces 29 formed by the extremities of the front walls of the spokes, and the rear face of the flange 28 bears against the front surface of the head piece arm 22 to which the rim flanges are secured by bolts 30 when the rim is in place. Additional bolts 31 are employed to secure the rim flanges together at intermediate points, whereby the bolts 30 may be removed to allow the rim to be demounted without permitting the sections 25 and 26 to separate until the bolts 31 are also removed. The contour of the rim sections 25 and 26 and their radially projecting marginal flanges 33 and 34 respectively, will, of course, be adapted to the requirements of the tire casing which the rim is intended to receive.

The material of which the spokes and rim is formed is preferably sheet steel. This material has considerable resiliency and where the wheel is suitably dished, as illustrated in the drawings, advantage may be taken of this resiliency to relieve the material from the effects of the heavy shocks to which the wheel is subjected under conditions of ordinary road travel. This feature materially adds to the durability of the rim members and spokes, as well as to the durability of the connections between the several webs and the hub and between the spokes and the head pieces 18. The resiliency of the wheel is increased by having the webs 7 and 8 and also the members 14 concavely curved, while by pressing the strips of metal composing the spokes into a form which is substantially U-shaped in cross section, great strength is secured in proportion to the weight of the material. I preferably leave the spokes open on the inner side, in order to secure maximum strength in proportion to the width of the strip. The width of the sides of the spoke largely determine its resistance to thrusts transverse to the line of travel and it is not necessary to close the interior cavity or channel since the open side of the spoke is not exposed to view.

In order to insure accurate seating of the rim flanges 27 and 28 upon the seating face 29 the latter may be slightly inclined, the radius increasing in the direction of the shoulder. This will also facilitate applying the rim to the spokes, and when the rim is drawn against the shoulder, the spoke ends may be forced inwardly to a slight extent and thus placed under resilient reactionary pressure.

I claim—

1. A wheel including a web spoke member, comprising a piece of sheet metal shaped to form a conical hub embracing annulus having radial arms, each partially folded along its longitudinal center line to form a spoke substantially U-shaped in cross section, the outer portions of said annulus being corrugated to form outwardly extending and progressively deepening channels, with the portions between said channels constituting continuations of the spokes in the direction of the hub.

2. A metallic wheel including the combination with a hub, of a piece of sheet metal having a hub embracing bell shaped annulus having its outwardly curving margin provided with radial extensions constituting sheet metal spokes, each partially folded, with the sides turned toward the inner face of the wheel.

3. A wheel including the combination with a hub concavely tapered at one end, of a sheet metal web pressed to fit the concavely tapered portion of the hub and extended toward a transverse plane of the hub along concave lines, and provided with integral extensions having inturned side margins and constituting spokes, and a tire engaging rim secured to the outer end portions of the spokes.

4. A wheel including the combination with a hub concavely tapered at one end, of a sheet metal web pressed to fit the concavely tapered portion of the hub and extended toward a transverse plane of the hub along concave lines, and provided with integral extensions having inturned side margins and constituting spokes, inclined rim supporting seatings near the outer ends of the spokes, and a circular member supported by said seatings in a position to connect the outer ends of the spokes, and secured to said outer ends beyond the seatings.

5. A metallic wheel including the combination with a hub, of a piece of sheet metal having a hub embracing bell shaped annulus having its outwardly curving margin provided with radial extensions constituting sheet metal spokes, each partially folded with the sides turned toward the inner face of the wheel, rim supporting head pieces seated within the partially folded outer ends of the spokes, and secured thereto, and a rim connected with said head pieces.

6. A wheel, including the combination with a hub, of a set of sheet metal spokes each having inwardly projecting marginal flanges, head pieces at their outer ends secured to the spokes between said marginal flanges, and forming seatings for a demountable rim, a rim adapted to fit said seatings, and detachable connections for securing the rim upon the seatings and to the spokes.

7. A wheel, including the combination with a hub, of a set of spokes U-shaped in cross section, and each provided with a shouldered head piece forming a rim seating within the U opening, a rim secured to the outer end of the spoke having an inwardly projecting annular member adapted to fit said seatings, and means for detachably securing said annular member to said seatings.

8. A wheel including the combination with a hub, having a conically tapered bearing face, of a conically tapered sheet metal annulus adapted to fit said bearing face, and curving outwardly therefrom and in the direction of the inner side of the wheel, said annulus having arms constituting extensions of said outwardly curving portion, and adapted to serve as spokes, each of said arms being partially folded to provide a spoke, U-shaped in cross section, with the margins projecting toward the inner face of the wheel, a reinforcing head piece secured to the outer end of each spoke, and adapted to provide seatings for the wheel rim, and a rim detachably secured to said seatings.

9. A metal wheel having spokes substantially U-shaped in cross section and open on one side, said spokes being inclined toward the open side from their inner ends outwardly, in combination with a hub with which the spokes are connected near one end, and a set of braces connecting the middle portions of the spokes with the other end portion of the hub.

10. A metal wheel including the combination with a hub having a tapered end, of a sheet metal web conforming to the tapered portion of the hub and curving outwardly therefrom in the direction of a transverse plane of the hub, said web having integral extensions constituting spokes, the side margins of which are bent toward the inner side of the wheel, substantially throughout their length and the outer ends of the spokes being provided with reinforcing seatings to receive a demountable rim, a demountable rim adapted to fit said seatings, and means for detachably connecting the rim with the seatings.

11. A metal wheel including the combination of a hub provided with tapered end portions, a set of sheet metal webs conforming to the respective tapered end portions of the hub and secured thereto, said webs converging in a transverse plane of the hub along curved lines, spoke arms projecting from the outer margin of one of the webs, braces projecting from the outer margin of the other web and engaging with the spoke arms, and a rim connecting the outer ends of the spoke arms.

12. A metal wheel including the combination of a hub provided with tapered end portions, a set of sheet metal webs conforming to the respective tapered end portions of the hub and secured thereto, said webs converging in a transverse plane of the hub along curved lines, spoke arms projecting from the outer margin of one of the webs, braces projecting from the outer margin of the other web and engaging with the spoke arms, and a rim connecting the outer ends of the spoke arms, said spoke arms having inturned side flanges between which said braces are received.

13. A metal wheel including the combination of a hub provided with tapered end portions, a set of sheet metal webs conforming to the respective tapered end portions of the hub and secured thereto, said webs converging in a transverse plane of the hub along curved lines, spoke arms projecting from the outer margin of one of the webs, braces projecting from the outer margin of the other web and engaging with the spoke arms, and a rim connecting the outer ends of the spoke arms, said spoke arms having inturned side flanges between which said braces are received, said spoke arms having their side margins pressed inwardly along curved lines, and the outer portions of the spoke supporting web being also curved inwardly between the spokes in continuance of said curved lines, the other web having its margin slitted between the braces and curved to fit the inwardly pressed portions of the spoke supporting web.

14. A wheel including a set of spokes, each having their outer ends provided with reinforcing seatings for a demountable rim adapted for two faced contact with such rim, in combination with a demountable rim having an inwardly projecting annular portion adapted to fit said seatings, and means for detachably connecting said rim to the seatings.

15. A metallic wheel including the combination with a hub, of a sheet metal web provided with spoke extensions, the margins of which are inturned, said web and spoke extensions being inclined toward the inner side of the wheel from the hub in the direction of the outer ends of the spokes, and concavely curved braces extending from the inner end portion of the hub and connected with the spoke extensions between the inturned margins of said spoke extensions in the middle portions of the spokes.

16. A metallic wheel including the combination with a hub, of a sheet metal web provided with spoke extensions, the margins of which are inturned, said web and spoke extensions being inclined toward the inner side of the wheel from the hub in the direction of the outer ends of the spokes, and braces extending from the inner end portion of the hub and connected with the spoke extensions, said braces including a common annular sheet metal foot piece having bracing extensions projecting between the margins of the spoke extensions.

17. A metallic wheel including the combination with a hub, of a sheet metal web provided with spoke extensions, the margins of which are inturned, said web and spoke extensions being inclined toward the inner side of the wheel from the hub in the direction of the outer ends of the spokes, and braces extending from the inner end portion of the hub and connected with the spoke extensions, said braces including a common annular sheet metal foot piece having bracing extensions projecting between the margins of the spoke extensions, and intermediate portions secured to the portions of said web between the spoke extensions.

18. A metallic wheel comprising the combination with a hub, of a set of concavely dished webs formed of sheet metal, said webs each having one margin connected with the hub, and the other marginal portions converging and united for mutual support, and a set of spokes radiating from the outer margin of one of the webs.

19. A metallic wheel comprising the combination with a hub, of a set of concavely dished webs formed of sheet metal, said webs each having one margin connected with the hub, and the other marginal portions converging and united for mutual support, and a set of spokes radiating from the outer margin of one of the webs, each spoke comprising an integral continuation of the web from which it radiates.

20. A dished wheel comprising the combination of a hub, a sheet metal web secured thereto and provided with spoke extensions inclined toward the inside face of the wheel, and braces extending outwardly from the inner portion of the hub, and connected with the spokes, said braces being concavely curved from the hub toward the radial plane which includes their points of connection with the spokes, and adapted to yield resiliently when the spokes are flexed.

21. A resilient wheel, including the combination of a hub, a set of spokes formed of resilient material, and inclined toward one side face of the wheel, a rim secured to the outer ends of the spokes, and a set of resilient braces for the spokes, each connecting the hub to one of the spokes, and concavely curved in the direction of a radial plane which includes the points of connection between the braces and the spokes.

22. A metallic wheel formed from a disk of sheet metal, and comprising a hub attaching portion and radially extending grooved portions, rim supporting head pieces secured in the grooved portions at the periphery of the wheel, and a demountable rim attached to the wheel through the said head pieces.

In testimony whereof I affix my signature in the presence of two witnesses.

REUBEN STANLEY SMITH.

Witnesses:
O. C. WEBER,
FREDERICK W. NOLTE.